US006906710B2

United States Patent
Matsuzaki et al.

(10) Patent No.: US 6,906,710 B2
(45) Date of Patent: Jun. 14, 2005

(54) DEVICE AND METHOD FOR FEATURE QUANTITY CALCULATION

(75) Inventors: Hiroshi Matsuzaki, Hachioji (JP); Takao Shibasaki, Tokyo (JP); Akio Kosaka, Hachioji (JP); Yukihito Furuhashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 292 days.

(21) Appl. No.: 10/102,120

(22) Filed: Mar. 20, 2002

(65) Prior Publication Data

US 2002/0174406 A1 Nov. 21, 2002

(30) Foreign Application Priority Data

Mar. 22, 2001 (JP) ........................................ 2001-083710

(51) Int. Cl.[7] .............................................. G06T 15/00
(52) U.S. Cl. ...................................... 345/419; 382/190
(58) Field of Search ................................. 345/419, 619, 345/427, 428; 716/4; 707/6; 382/190

(56) References Cited

U.S. PATENT DOCUMENTS 6,404,920 B1 * 6/2002 Hsu ........................... 382/190

FOREIGN PATENT DOCUMENTS

| JP | 6-215105 | 8/1994 |
|---|---|---|
| JP | 2000-222428 | 8/2000 |

OTHER PUBLICATIONS

E. Paquet, et al., "A Content–based Search Engine for VRML Databases", IEEE Computer Society Conference on Computer Vision and Patterm Recognition, p. 541–546, 1998.

* cited by examiner

Primary Examiner—Phu K. Nguyen
(74) Attorney, Agent, or Firm—Scully, Scott, Murphy & Presser

(57) ABSTRACT

A feature quantity calculation device to calculate a feature quantity for a 3-D object from 3-D object data contained in the 3-D object includes a 3-D object data input module to input the 3-D object data, a 3-D object data analysis module to analyze the input 3-D object data, a volume data conversion module to convert the analyzed 3-D object data to volume data, and a feature quantity calculation module to calculate a feature quantity from the converted volume data.

15 Claims, 4 Drawing Sheets

DEVICE AND METHOD FOR FEATURE QUANTITY CALCULATION

CROSS-REFERENCE TO RELATED APPLICATIONS

This application is based upon and claims the benefit of priority from the prior Japanese Patent Application No. 2001-083710, filed Mar. 22, 2001, the entire contents of which are incorporated herein by reference.

BACKGROUND OF THE INVENTION

1. Field of the Invention

The present invention relates to a feature quantity calculation device and a method thereof for calculating a 3-D (three-dimensional) object's feature quantity capable of being used for recognition of 3-D objects and retrieval of similar 3-D objects from 3-D object data contained in the 3-D object.

2. Description of the Related Art

In recent years, data formats for expressing 3-D objects are widely used for representing CAD (Computer-Aided Design) data, 3-D object data for merchandise, archaeology, and works of art, digital archive of data, etc. These types of data are increasing steadily. There is an increasing need for efficiently managing stored 3-D object data and effectively retrieving 3-D object data requested by users.

Various technologies are proposed to satisfy these demands. In a technology of retrieving "similar objects", there is proposed a method of calculating a feature quantity included in an object and performing a retrieval according to the calculated feature quantity.

For example, the following technology is disclosed in Jpn. Pat. Appln. KOKAI Publication No. 6-215105. The 3-D geometrical information mainly comprises vertex coordinates as geometrical information about vertexes of a formed polygon and topological information (connection information) about the vertexes. As additional information, there are provided normal vector information at the vertexes, color information about the vertexes, etc. A user uses the above-mentioned predetermined pieces of information for retrieving similar objects.

In Jpn. Pat. Appln.KOKAI Publication No. 2000-222428, the following technology is disclosed. When a user retrieves similar objects, a retrieval object is simplified. A feature quantity for expressing shape is extracted from the simplified retrieval object. A similar object is retrieved by comparing the feature quantity for the above-mentioned retrieval object with that for an object to be retrieved.

According to the method, feature quantity examples include an object's centroid, distribution of distances from a centroid to each face constituting an object, an average value of angles formed by normal lines for adjacent faces constituting an object, etc.

Further, the following technology is disclosed in "A Content-based Search Engine for VRML Databases" (Proceedings, IEEE Computer Society Conference on Computer Vision and Pattern Recognition, pp. 541–546, 1998). A similar object is retrieved by calculating the feature quantity for a target 3-D object written in the VRML (Virtual Reality Modeling Language).

The example also uses the feature quantity to represent a 3-D object's shape. The feature quantity is calculated by statistically processing the standard deviation of distances from an object's centroid to each vertex or the product of an area of polygon patches by a value equivalent to a distance between the polygon patch's vertex and centroid. The calculated feature quantity is used to retrieve 3-D objects.

The above-mentioned prior art finds the feature of a 3-D object from structural information (position information, connection information about vertexes, or polygon patch) about a wire frame with respect to the shape feature.

When the above-mentioned vertex position information is used, for example, an array of vertexes has no regularity or isotropy. When the above-mentioned vertex connection information is used, no regularity is defined for a method of generating the connection relationship. Accordingly, an object comprises polygon patches with different size.

It is difficult to systematically calculate the feature quantity for all object data. There is a limited number of feature quantities that can be calculated based on the position information and the connection information about vertexes, making it difficult to define diverse feature quantities. If a user retrieves an intended object just by using a few feature quantities, accurate and efficient retrieval is difficult.

In many cases, a user retrieves similarly shaped objects with respect to similarity of outside shapes (wire frames). Structural information about a wire frame contains information about the structural feature inside the object. The information about the structural feature inside the object is unnecessary for the user to retrieve similar objects. When the user retrieves similar objects, the feature quantity is calculated by using data containing the unnecessary information, degrading the retrieval accuracy and retrieval speed.

BRIEF SUMMARY OF THE INVENTION

It is an objective of the present invention to provide a feature quantity calculation device and a method thereof capable of systematically calculating feature quantities for almost all object data and calculating highly accurate and efficient feature quantities because of capability of defining diverse feature quantities.

In order to achieve the above-mentioned objective, according to a first aspect of the invention, there is provided a feature quantity calculation device to calculate a feature quantity for a 3-D object from 3-D object data contained in the 3-D object comprising: a 3-D object data input module to input the 3-D object data; a 3-D object data analysis module to analyze the input 3-D object data; a volume data conversion module to convert the analyzed 3-D object data to volume data; and a feature quantity calculation module to calculate a feature quantity from the converted volume data.

The present invention provides a feature quantity calculation method of calculating a feature quantity for a 3-D object from 3-D object data contained in the 3-D object comprising: inputting the 3-D object data; analyzing the input 3-D object data; converting the analyzed 3-D object data to volume data; and calculating a feature quantity from the converted volume data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

With reference to FIGS. 1 through 4 in order, the feature quantity calculation device according to an embodiment of the present invention will be described along with a feature quantity calculation method thereof.

Figure 1:
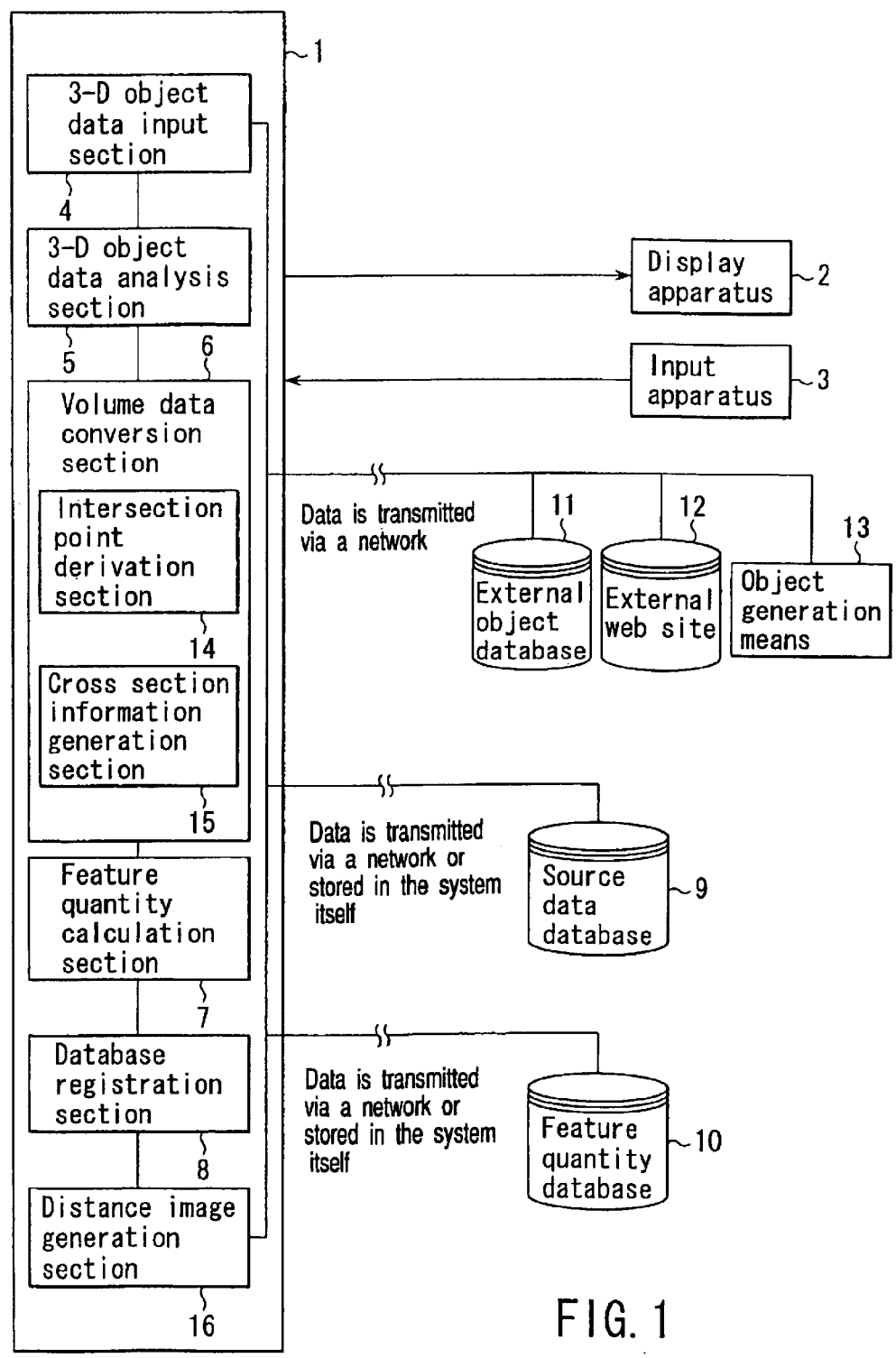
FIG. 1 is a system configuration diagram showing internal and external configurations of a feature quantity calculation device according to an embodiment of the present invention.

FIG. 1 is a system configuration diagram according to the embodiment of the present invention.

The feature quantity calculation device according to the embodiment of the present invention includes an arithmetic unit 1. The arithmetic unit 1 is mounted on a computer that serves as a platform.

A display apparatus 2 is connected to such as a CRT (Cathode Ray Tube), an LCD (Liquid Crystal Display) and the like.

The arithmetic unit 1 connects with a data operation and input apparatus 3 such as a keyboard, a mouse, a tablet, a voice input device, or the like, a source data database 9, and a feature quantity database 10.

Further, the arithmetic unit 1 connects with an external object database 11 and an external Web site 12 via a network such as the Internet. The external object database 11 and the external Web site 12 are installed outside the arithmetic unit 1.

Moreover, the arithmetic unit 1 connects with an object generation means 13 which allows a user to freely create data by using CAD (Computer-Aided Design), etc.

In addition to the above-mentioned CAD data, data created by the object generation means 13 includes: user-created data by using a 3-D object generation tool; data created by, e.g., a 3-D object modeling apparatus which allows a user to create a 3-D object freehand; data input by a 3-D object input apparatus; and data input by a laser range finder, a laser scanner, etc. which can generate a distance image (to be described) by photographing a 3-D object.

The arithmetic unit 1 comprises a 3-D object data input module 4, a 3-D object data analysis module 5, a volume data conversion module 6, a feature quantity calculation module 7, a database registration module 8, and a distance image generation module 16. The 3-D object data analysis module 5 analyzes converted volume data. The volume data conversion module 6 converts 3-D object data to volume data. The feature quantity calculation section 7 calculates a feature quantity. The database registration module 8 registers the calculated feature quantity to a database. The distance image generation module 16 generates a distance image.

The volume data conversion module 6 includes an intersection point derivation module 14 and a cross section information generation module 15 as will be described later.

The display apparatus 2 displays object data such as 3-D solids. The display apparatus 2 includes the following windows (not shown). An object catalog browse window shows a list of objects in the database. An object rendering window shows an input object. A condition setup window provides a plurality of objects for a user to specify retrieval conditions and shows a list of retrieval conditions specified by the user. A retrieval result display window shows a retrieval result in a plurality of modes.

The source data database 9 stores source data of 3-D objects and volume data converted by the arithmetic unit 1. The feature quantity database 10 stores a 3-D object's feature quantity calculated by the arithmetic unit 1.

The source data database 9 and the feature quantity database 10 can be provided as a plurality of divided databases, if necessary.

The embodiment explains the form of distributed databases, but the present invention is not limited thereto. It is also possible to construct a single database.

The following describes a flow of processing according to the embodiment of the present invention.

The 3-D object data input module 4 further includes an object database browse means (not shown). The object database browse means is equivalent to, e.g., various browsers, etc. When retrieving 3-D objects by using a browser, a user references the source data database 9 or the feature quantity database 10. He or she can browse various 3-D object data registered in the source data database 9 or the feature quantity database 10.

The user browses 3-D objects displayed in the browser and selects any object in the source data database 9 or the feature quantity database 10. The user then incorporates the selected object data into the arithmetic unit 1.

When no feature quantity is calculated for the selected object data, the feature quantity calculation device according to the present invention calculates a feature quantity as will be described later in detail.

The 3-D object data registered in the above-mentioned databases contains information comprising a vertex coordinate information string, a vertex color information string, a vertex connection information string, texture information about polygon patches constituting an object, etc.

The user can select objects elsewhere than from the registered 3-D object data.

For example, it is also possible to select existing 3-D objects registered in the external object database 11 such as an external electronic catalog or in a database of the external Web site 12 made public on an Internet Web site.

The user can use object data generated by the externally installed object generation means 13.

For example, the user can use any of the following data representing 3-D forms: user-created 3-D object data by means of a CAD program, a 3-D object generation tool, etc.; 3-D object data in a 2-D image format captured by using a 3-D object acquisition or input apparatus such as a range finder; volume-form data comprising layered slice images such as medical data by means of CT (Computed Tomography), MRI (Magnetic Resonance Imaging), etc.; and any volume data used in the other fields.

Figure 2:
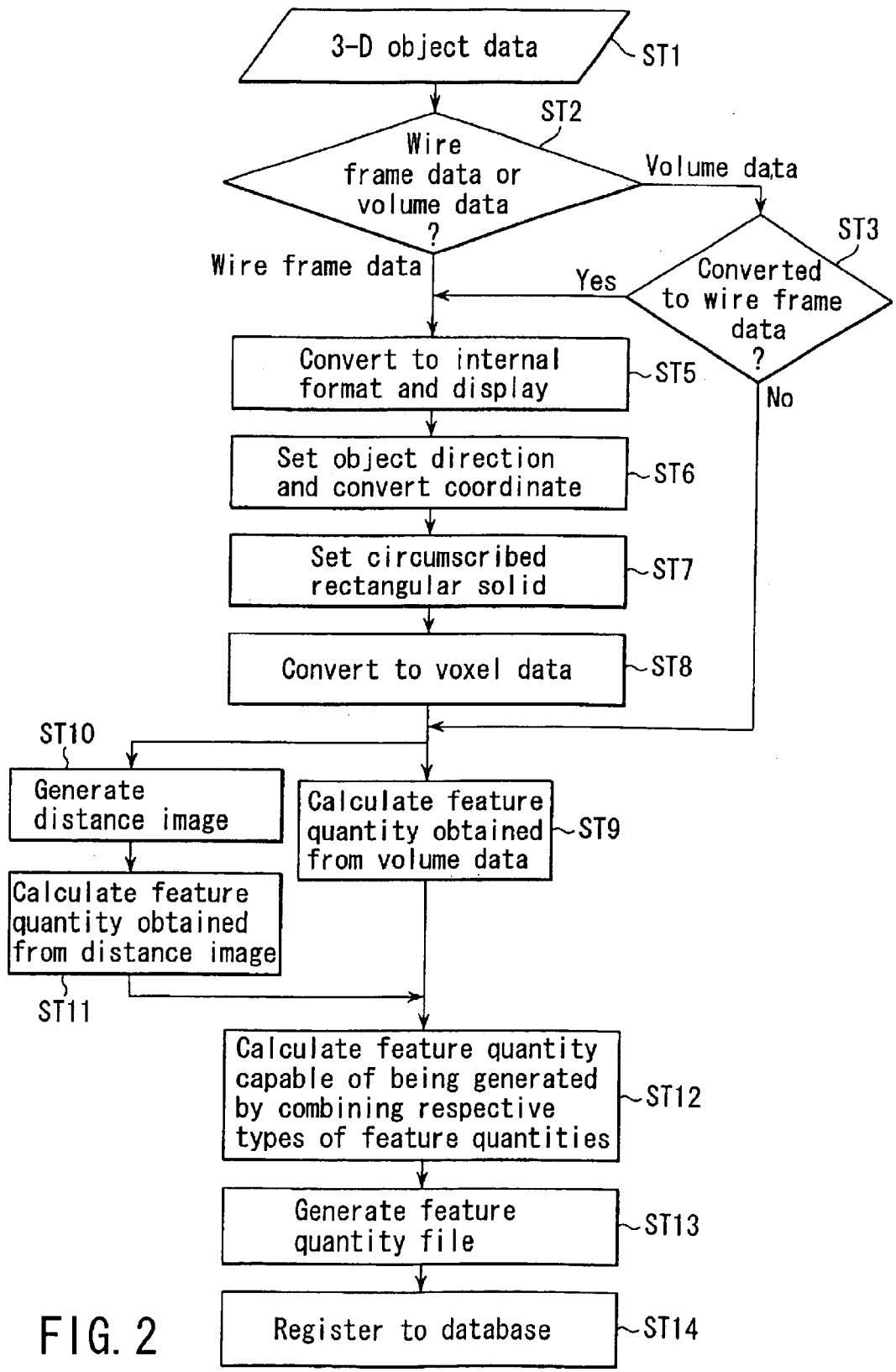
FIG. 2 is a flowchart which shows a procedure from calculating a feature quantity based on input 3-D object data to registering the calculated feature quantity to a feature quantity database with respect to the feature quantity calculation device according to the embodiment of the present invention.

Referring now to FIG. 2, the following describes a flow of retrieving a specific similar object according to the embodiment of the present invention.

FIG. 2 is a flowchart for retrieving a similar object.

As shown in FIG. 2, a 3-D object (hereafter referred to as an object) data is input at step (ST) 1. The object data is input from the object data input module 4 (see FIG. 1).

The following methods are available for object data input.

A user can select any object data from a group of objects displayed by the object database browse means such as various browsers, for example. Further, the user generates object data into any shape and inputs it. Moreover, the user retrieves existing object data and inputs the retrieved object data.

The 3-D object data analysis section 5 in the arithmetic unit 1 determines a data format of the input object data, i.e., determines whether the input object data is wire frame data or volume data (ST2 in a volume data analysis module).

When it is determined that the input object data is of a volume data type, the process proceeds to the next step ST3.

At ST3, it is determined whether the input object data is converted to wire frame data.

The input object data is predetermined as volume data. Normally, the process proceeds to ST9 without conversion to volume data. A feature quantity is calculated directly from the volume data. The process proceeding to ST10 will be described later.

When the input object data is rendered, it is better to convert the data to wire frame data, because this conversion can be performed at high speed. The process converts the input volume data to wire frame data, then proceeds to ST5.

A wireframe-like feature quantity can be calculated by converting the input volume data to wire frame data.

The volume data conversion module 6 (FIG. 1) is used for the conversion of volume data.

When the 3-D object data analysis module 5 determines at ST2 that the input object data is of a wire frame data type, the process proceeds to ST5.

At ST5, the arithmetic unit 1 converts the data to an internal format for rendering and displays it on the display apparatus 2.

An object is displayed three-dimensionally on the screen of the display apparatus 2. Using the operation and input apparatus 3 such as a mouse, for example, a user can display the object at any viewpoint, and enlarge, reduce, or manipulate otherwise the object the screen of the display apparatus 2.

Generally, the above-mentioned internal format may be any format to be converted during rendering as conventionally practiced.

Initially, the coordinate system (X, Y, Z) is used for vertex coordinates of object data input from the object data input module 4.

When there are not accurately defined top-bottom, front-back, and right-left relationships of an object, the user changes a viewpoint by using a mouse, for example. The user sets front-back, right-left, and top-bottom directions, and converts and defines the 3-D coordinate system (x, y, z) of the object.

Specifically, the user configures the setting so that the top-bottom direction of the object-corresponds to that on the display apparatus 2 and the front viewpoint is enabled.

In this state, the user configures settings by using a front setup menu or button to convert all vertex coordinates.

The coordinate conversion converts a source object data's vertex coordinate data string $V_1(X_1, Y_1, Z_1), \ldots, V_N(X_N, Y_N, Z_N)$ to $V_1(x_1, y_1, z_1), \ldots, V_N(x_N, y_N, z_N)$.

Here, a vertex connection information data string is expressed as $P_1(V_{11}, V_{12}, V_{13}), \ldots, P_M(V_{N1}, V_{N2}, V_{N3})$. Texture information is expressed as $T_1(V_{11}, V_{12}, V_{13}), \ldots, T_M(V_{N1}, V_{N2}, V_{N3})$.

The following describes a method of converting volume data. When volume data is generated, there is defined a rectangular enclosure or a cubic enclosure of an object. Hereinafter, a rectangular enclosure and a cubic enclosure are generically referred to as a rectangular enclosure.

Figure 3A:
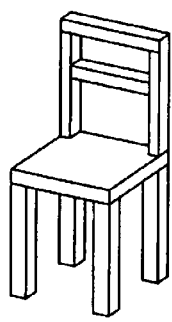
FIG. 3A is a perspective view of an input 3-D object, e.g., a chair used as a model, rendered based on the feature quantity calculation device according to the embodiment of the present invention.
Figure 3B:
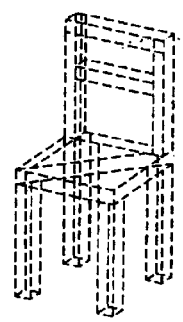
FIG. 3B is a perspective view of an input 3-D object, e.g., a chair used as a model, represented as wire frame data based on the feature quantity calculation device according to the embodiment of the present invention.
Figure 3C:
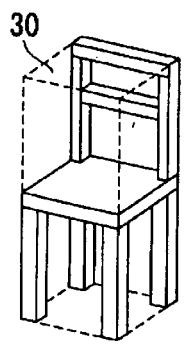
FIG. 3C is a perspective view of a circumscribed rectangular solid for the input 3-D object, e.g., a chair used as a model, by calculating maximum and minimum values for respective coordinate axes in the length, width, and height directions of the 3-D object based on the feature quantity calculation device according to the embodiment of the present invention.

The rectangular enclosure is a minimum solid which circumscribes an object and contains the entire object (see FIG. 3C).

The arithmetic unit 1 compares coordinate components of all vertex data for the object and finds maximum and minimum values for X, Y, and Z.

The arithmetic unit 1 sets a rectangular enclosure so that each side is parallel to the coordinate axis (ST7).

The volume data conversion module 6 converts the rectangular enclosure to volume data comprising continuous voxel data (ST8).

The following describes a specific method of conversion to volume data.

A cross section is defined parallel to any face of the rectangular enclosure.

The intersection point derivation module 14 calculates all intersection points between the cross section and the above-mentioned object's wire frame as intersection point information.

The cross section information generation module 15 determines whether the object is positioned inside or outside the intersection point information as intersection points with the cross section. The inside of the object is represented in white and the outside thereof is represented in black (to be described in FIG. 3).

The cross section is moved in units of specified slice pitches to define a plurality of cross sections. The intersection point information is created for all the cross sections. The same process is repeated to represent the inside of the object in white and the outside thereof in black with respect to a plurality of cross sections.

This generates volume data comprising continuous voxel data.

As mentioned above, the volume data comprises continuous voxel data. Therefore, it is possible to appropriately express the object's shape feature when a feature quantity is calculated.

Since volume data is generated by using a rectangular enclosure circumscribing the object, the capacity of the generated volume data can be minimized.

The front-back, right-left, and top-bottom directions previously correspond to the coordinate axes for feature quantity calculation. Accordingly, a highly accurate retrieval is available when the object similarity is calculated.

The feature quantity calculation section 7 calculates the feature quantity from the volume data comprising continuous voxel data (ST9), then proceeds to the next step ST12.

The distance image generation section 16 generates a distance image from the volume data comprising the above-mentioned voxel data (ST10). The arithmetic unit 1 calculates the feature quantity obtained from the distance image (ST11), then proceeds to the next step ST12.

The following describes how to generate a distance image.

The distance image generation module 16 projects the generated volume data onto any plane of the rectangular enclosure. It is possible to define the height of a perpendicular line from the plane toward the object surface. Further, it is possible to define an image having the height of the perpendicular line as a size in the 2-D coordinate system configured inside the plane. The image thus defined is a distance image. The more specific description will be given with reference to FIG. 3.

At ST12, the feature quantity calculation module 7 combines the feature quantity calculated from the volume data with the feature quantity calculated from the wire frame data to calculate a feature quantity.

Different types of feature quantities are calculated from the volume data and the wire frame data. The user can define a feature quantity calculated by combining respective feature quantities.

When retrieving a similar object, the user can accurately specify an object to be retrieved, allowing accurate retrieval.

At the next step ST13, a feature quantity file is generated from the calculated feature quantity. The feature quantity file is associated with source object data and is registered to the feature quantity database 10 (ST14 in the database registration module).

The above-mentioned feature quantity may not be only a numeric value, but also a thumbnail image or attribute information about a plurality of objects (object name, keyword, etc.)

The arithmetic unit 1 generates a management file for saving a plurality of feature quantity files. The user can obtain object information by accessing the management file.

Referring now to FIG. 3, an embodiment using a chair as a model of a 3-D object will be described.

The 3-D object data input section 4 inputs a chair as a 3-D object (hereafter referred to as a 3-D object, e.g., a chair,). The arithmetic unit 1 renders object data contained in the 3-D object, e.g., a chair.

FIG. 3A shows the rendered image. FIG. 3B shows a wire frame of the 3-D object, e.g., a chair.

The arithmetic unit 1 calculates maximum and minimum values for respective coordinate axes (X, Y, Z) of the object to generate a rectangular enclosure for the object.

FIG. 3C shows the generated rectangular enclosure. The arithmetic unit 1 provides a plane (hereafter referred to as a top face) 30 parallel to the top of the rectangular enclosure. The arithmetic unit 1 sequentially generates cross sections with the 3-D object, e.g., a chair, from the top face 30 of the rectangular enclosure.

The intersection point derivation section 14 generates an intersection point between the cross section and the object's wire frame data as intersection point information.

Based on the intersection point information, the cross section information generation section 15 displays the outside of the 3-D object's, e.g., a chair, intersection point in black and the inside thereof in white.

Figure 3D:
FIGS. 3D through 3G show that a plane is formed parallel to the top of the circumscribed rectangular solid for the input 3-D object, e.g., a chair, based on the feature quantity calculation device according to an embodiment of the present invention, cross sections of the 3-D object are sequentially generated with specified distances from the plane parallel to the top of the circumscribed rectangular solid, there are obtained intersection points between the wire frame data for the 3-D object and each cross section to provide intersection point information, and an outside of the 3-D object, e.g., a chair, is represented in black and an inside thereof is represented in white based on the intersection point information.

For example, FIG. 3D shows an image generated from the circumscribed rectangular solid's cross section corresponding to the top of the 3-D object, e.g., a chair.

Figure 3E:
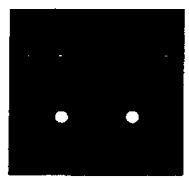

FIG. 3E shows an image generated from the rectangular enclosure cross section corresponding to the vicinity of the base of the seat back in the 3-D object, e.g., a chair.

Figure 3F:

FIG. 3F shows an image generated from the rectangular enclosure cross section corresponding to the seat in the 3-D object, e.g., a chair.

Figure 3G:
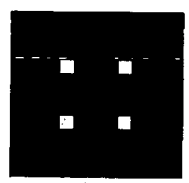

FIG. 3G shows an image generated from the rectangular enclosure cross section corresponding to the legs in the 3-D object, e.g., a chair.

There is generated volume data comprising continuous voxel data by properly setting the resolution of a 2-D image for the cross section or an interval between cross sections.

By using the generated volume data, the arithmetic unit 1 calculates a feature quantity.

As information contained in the volume data, the numbers of pixels in the X-Y-Z coordinate system are represented as K, L, and M corresponding to the respective directions. Intervals between pixels in the X-Y-Z coordinate system are represented as $X_{div}$, $Y_{div}$, and $Z_{div}$ corresponding to the respective directions.

Edge lengths of the rectangular enclosure can be represented as $X = K \cdot X_{div}$, $Y = L \cdot Y_{div}$, and $Z = M \cdot Z_{div}$.

Any values can be specified for K, L, and M.

The converted volume data is defined as follows.

$$v(x, y, z) = \begin{cases} 1 & \ldots \text{Area inside the object} \\ 0 & \ldots \text{Area outside the object} \end{cases}$$

As feature quantities calculated here, it is possible to use a volume of the rectangular enclosure $V_{rect} = XYZ$ and a surface area thereof $S_{rect} = 2(XY + YZ + ZX)$.

These feature quantities can be used as those concerning an object size when the feature quantity calculation module 7 calculates a feature quantity.

When the feature quantity calculation module 7 calculates a feature quantity, it is also possible to define the feature quantity by approximating the volume data as an ellipsoid.

An approximate ellipsoid is calculated as preprocessing.

The following equation shows the 3-D coordinate for the center of the approximate ellipsoid.

$$\vec{C}^{ellipse} = (C^{ellipse}_x, C^{ellipse}_y, C^{ellipse}_z)$$

The feature quantity calculation section 7 calculates the 3-D coordinate for the center of the approximate ellipsoid, direction vectors for the major and minor axes of the approximate ellipsoid, and lengths of three axes $x^{ellipse}$, $y^{ellipse}$, and $z^{ellipse}$.

As preprocessing, the feature quantity calculation section 7 also calculates an object centroid as shown in the following equation.

$$\vec{G} = (G_x, G_y, G_z)$$

Let us assume that the center of the circumscribed rectangular solid is defined to be the center of the object as follows.

$$\vec{C}^{rect} = (C^{rect}_x, C^{rect}_y, C^{rect}_z)$$

The feature quantity calculation section 7 can use positions of three points, i.e., the object center, the object centroid, and the approximate ellipsoid center as basic quantities for calculating feature quantities.

As feature quantities for the volume data, it is possible to define: object volume $V_{obj}$; approximate ellipsoid volume $V_{ellipse} = \pi X_{ellipse}, Y_{ellipse}, Z_{ellipse}/6$; object surface area $S_{obj}$; approximate ellipsoid's surface area $S_{ellipse}$; the distribution for the object center, the object centroid, and the approximate ellipsoid center; moments of inertia around three axes with reference to the object center, the object centroid, and the approximate ellipsoid center as origins; and a histogram divided in each axis direction of the moments of inertia.

The feature quantity calculation module 7 calculates these feature quantities by using the following definitional equation.

$$D_C = \frac{1}{KLM} \sum_k^K \sum_j^J \sum_l^I v(k, l, m) \|\vec{r}(k, l, m) - \vec{C}\|^2$$

(Dc: distribution)

$\vec{C}$

The distribution feature for each point is found by giving the object center, the object centroid, and the approximate ellipsoid center, where $$\vec{r}(k, l, m) = (k \cdot x_{div}, l \cdot y_{div}, m \cdot z_{div})$$

The moment of inertia:

$$M_{x_i} = \sum_m^M \sum_l^L \sum_k^K v(k, l, m) \|\vec{r}(k, l, m) - \vec{r}_{x_i}^{\perp}(k, l, m)\|^2$$

where $\vec{r}_{x_i}^{\perp}(i, j, k)$ is a foot of the perpendicular line toward the $X_i$ axis from point r(i, j, k).

Nine feature quantities can be defined by assuming X axes to be three orthogonal coordinate axes using the rectangular enclosure center, the circumscribed rectangular solid centroid, and the approximate ellipsoid center as origins.

The following equations formulate histograms for the moments of inertia.

$$\begin{cases} M^x i_1 = \sum_m^M \sum_l^L \sum_{k=1}^W v(k, l, m) \|\vec{r}(k, l, m) - \vec{r}_{x_i}^{\perp}(k, l, m)\|^2 \\ \vdots \\ M^x i_n = \sum_m^M \sum_l^L \sum_{k=(n-1)W+1}^{nW} v(k, l, m) \|\vec{r}(k, l, m) - \vec{r}_{x_i}^{\perp}(k, l, m)\|^2 \\ \vdots \\ M^x i_N = \sum_m^M \sum_l^L \sum_{k=(N-1)W+1}^{NW} v(k, l, m) \|\vec{r}(k, l, m) - \vec{r}_{x_i}^{\perp}(k, l, m)\|^2 \end{cases}$$

where W is the width of one area (in pixels) for the histogram creation, and N is the number of divisions NW=K.

The following equation can be used to calculate a ratio of the object's surface area to the object's volume. The ratio can be considered to express the object's shape complexity Fcomplexity.

$$\sqrt{\frac{S_{obj}}{4\pi}} \Big/ 3\sqrt{\frac{3V_{obj}}{4\pi}}$$

(The coefficient needs to be specified so that the result becomes 1 in the case of a sphere.)

The deviation ratio of the rectangular enclosure centroid to the center and that of the approximate ellipsoid's center position are respectively given by:

$(GX \cdot C^{rect}_x)/X_{rect}, (GY \cdot C^{rect}_y)/Y_{rect}, (GZ \cdot C^{rect}_z)/Z_{rect}$ $(GX \cdot C^{ellipse}_x)/X_{rect}, (GY \cdot C^{ellipse}_y)/Y_{rect}, (GZ \cdot C^{ellipse}_z)/Z_{rect}$ The feature quantities calculated by these equations express deviation directions of the object shape.

Degrees and directions of the object's slenderness are expressed by the four feature quantities as follows. The size ratio of the object in each axis direction is expressed as $X_{rect}/Y_{rect}$, $Y_{rect}/Z_{rect}$ or $Z_{rect}/X_{rect}$. The ratio of each axis for the approximate ellipsoid is expressed as $X_{ellipse}/Y_{ellipse}$, $Y_{ellipse}/Z_{ellipse}$, or $Z_{ellipse}/X_{ellipse}$. The sphere ratio is expressed as $\min(X_{ellipse}, Y_{ellipse}, Z_{ellipse})$. The cube ratio is expressed as $\min(X, Y, X)\max(x, Y, Z)$.

The rectangular enclosure occupancy $V_{obj}/V_{rect}$ is a feature quantity representing the similarity to a rectangular enclosure. The approximate ellipsoid volume fraction $V_{obj}/V_{ellipse}$ is a feature quantity representing the similarity to an approximate ellipsoid.

It is also possible to define as feature quantities the cooccurrence matrix, the ratio of directional secondary moment calculated from the cooccurrence matrix, and MPS (Metric Pattern Signature) and APS (Angular Pattern Signature) as 3-D Fourier features.

While there have been described examples of feature quantities calculated from the converted volume data, it is possible to consider a distance image as the feature quantity for an object when it is viewed from a given direction. The feature quantity calculated from the distance image can be also used as an object's feature quantity.

The distance image is generated by projecting an object onto six faces of the rectangular enclosure for the object. The feature quantity is calculated from each distance image.

The method of generating the distance image will be described with reference to FIG. 3 as an example.

Figure 3H:
FIGS. 3H through 3M show distance images formed by projecting the input 3-D object, e.g., a chair, according to the embodiment of the present invention onto six faces (front, rear, left, right, top, and bottom) of the circumscribed rectangular solid.
Figure 3I:
Figure 3J:
Figure 3K:
Figure 3L:
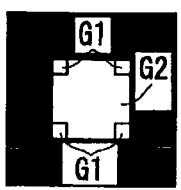
Figure 3M:
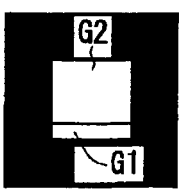

The arithmetic unit 1 generates distance images projected onto six faces (front, rear, left, right, top, and bottom) of the rectangular enclosure from the converted volume data. FIG. 3H shows an image projected onto the front face. FIG. 3I shows an image projected onto the rear face. FIG. 3J shows an image projected onto the left face. FIG. 3K shows an image projected onto the right face. FIG. 3L shows an image projected onto the top face. FIG. 3M shows an image projected onto the bottom face.

These images represent the distance information by pixel brightnesses. The figures uses codes for distinguishing between brightnesses. A brighter pixel represents the object farther from the projection plane.

For example, the projected figures in FIGS. 3H through 3K are represented in black and gray brighter than black. The gray is designated by code G1. FIGS. 3L and 3M are represented in black and two gray colors brighter than black. The two gray colors are designated by codes G1 and G2. The gray G1 is brighter than G2.

The following feature quantities can be calculated from the distance image.

One feature quantity is a histogram comprising distance values from a given point in the distance image. Another feature quantity is a histogram of curvature defined by pixels in the distance image. Yet another feature quantity is obtained in such a manner that the arithmetic unit 1 performs the wavelet conversion to a plurality of resolutions for the distance image and expresses values for areas corresponding to the respective resolutions in vectors.

While there have been described the feature quantities calculated from the converted volume data, a feature quantity can be also calculated from the source wire frame data. It is possible to define a feature quantity by combining the feature quantity calculated from the wire frame data with that calculated from the converted volume data. Calculating such feature quantity makes it possible to use more diverse feature quantities. There is provided an effective means for retrieval of similar objects by users.

The following describes in detail how to calculate a feature quantity which can be defined by combining the feature quantity calculated from the wire frame data with that calculated from the converted volume data.

The feature quantity calculation section 7 calculates a feature quantity from the wire frame data. The feature quantity calculated from the wire frame data uses input object data given as a set of polygon patches. Accordingly, it is possible to define sum S of respective polygon patch areas and extended Gaussian sphere $S_{gauss}$ given as the sum of products of the polygon patch areas and the unit normal vectors of the polygon patches.

For example, the extended Gaussian sphere $S_{gauss}$ can be defined by the following equation.

$$S_{gauss} = \sum_{i=1}^{n} S_k \cdot n_k$$

where N is the number of patches, $S_k$ the area of the kth patch, and $n_k$ the feature quantity which can be defined by calculating feature quantities from the unit normal vector volume data and the wire frame data for the kth polygon patch and combining the calculated feature quantities.

The feature quantity can use any value expressing a 3-D feature quantity.

The arithmetic unit 1 generates feature quantity files from the calculated feature quantity and registers them to the feature quantity database 10.

When registering the feature quantity files to the feature quantity database 10, the arithmetic unit 1 associates the feature quantity files and the converted volume data with the source object data, then registers them to the feature quantity database 10.

The source object data contains texture information. The arithmetic unit 1 can add the texture information as a feature quantity when registering the feature quantity to the feature quantity database 10.

In addition, feature quantities to be calculated can be categorized into several types. The arithmetic unit 1 can define different types of feature quantities (shape, size, texture including color features, position, etc.) when registering the feature quantity to the feature quantity database 10.

The arithmetic unit 1 groups feature quantities into several types to organize a database when registering the feature quantity to the feature quantity database 10. A user can use feature quantity types as retrieval conditions for retrieval. The more diverse retrieval is available.

When retrieving a similar object next time, the user uses the calculated feature quantity. At this time, the user can retrieve a similar object by using a feature vector (to be described) which is expressed as an n-dimensional vector having the feature quantity (shape, size, texture including color features, position, etc.) as a component.

For example, the user can retrieve a similar object by using a feature vector defining the object shape to be spherical and the object color to be red as retrieval conditions.

Figure 4:
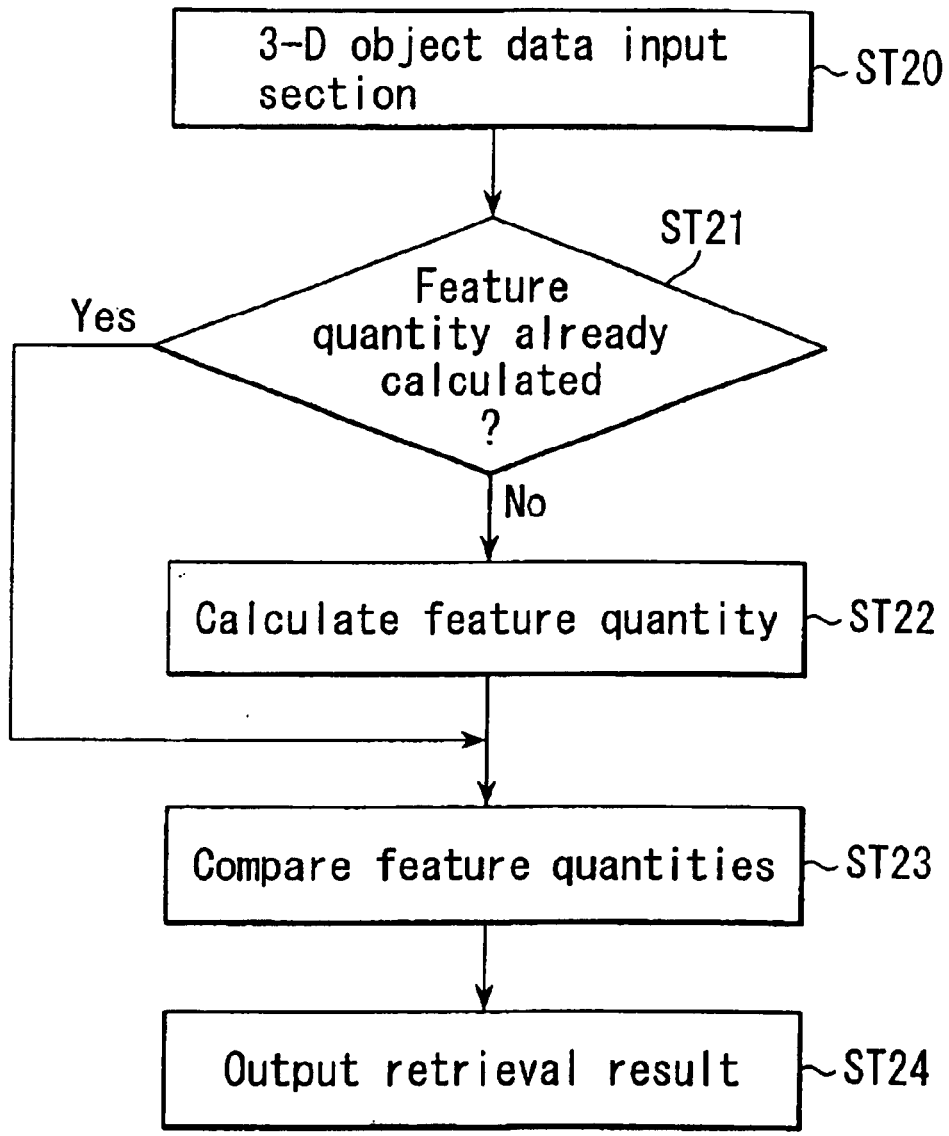
FIG. 4 is a flowchart which shows a flow of processing of calculating feature quantities from the 3-D object data according to the embodiment of the present invention, comparing the feature quantities, and retrieving a similar object.

With reference to FIG. 4, the following describes the similar object retrieval method according to the embodiment of the present invention.

The 3-D object data input module 4 inputs object data (ST20).

Referencing the feature quantity database 10, the arithmetic unit 1 determines whether or not the feature quantity for the input object data is already calculated (ST21).

When no feature quantity is calculated, the arithmetic unit 1 proceeds to ST22 to calculate a feature quantity (to be described in detail). The arithmetic unit 1 registers the feature quantity as feature quantity files to the feature quantity database 10, then proceeds to ST23.

When the feature quantity is already calculated at ST21, the calculating the feature quantity is omissible. The arithmetic unit 1 proceeds to ST23 and sequentially compares the calculated feature quantity with all feature quantity files in the feature quantity database 10 and any databases.

During the comparison of feature quantity files, the arithmetic unit 1 retrieves a file matching the calculated feature quantity from the feature quantity database 10 and any databases.

When the retrieval produces retrieval results indicating whether or not the intended object is found, the arithmetic unit 1 outputs the retrieval results, e.g., in the descending order of similarity (ST24).

Let us assume that there are calculated M feature quantities $f_1$ through $f_M$ at ST22, the database for the retrieval contains N data entries $I_1$ through $I_N$, and feature quantity matrix F is defined to be as follows.

$$F = \begin{pmatrix} F_{11} & F_{12} & \cdots & F_{1p} & \cdots & F_{1M} \\ F_{21} & \ddots & & & & \\ \vdots & & \ddots & & & \\ F_{q1} & & & F_{qp} & & \\ \vdots & & & & \ddots & \\ F_{N1} & & & & & F_{NM} \end{pmatrix} \quad (1)$$

The feature quantity vector for the qth 3-D image $I_q$
$\vec{f_q}$
is expressed as $$\vec{f_q} = \sum_{j=1}^{M} w_j \cdot \{D(kj \cdot (F_{qj} - \overline{F_j}))\} \cdot \vec{i_j} \quad (2)$$

In equation (2), each term is normalized by multiplication of $k_j$.
The terms in the equation are values defined as $$\overline{F_p} = \frac{1}{N}\sum_{j=1}^{N} F_{jp},\ v_p = \frac{1}{N}\sum_{j=1}^{N}(F_{jp} - \overline{F_p})^2,\ \sigma_p = \sqrt{v_p},\ K_p = \frac{1}{\sigma_p}$$

$$D(x) = \begin{cases} x & |x| \leq d \\ d & |x| > d \end{cases}$$

(d: specially specified value)
where $w_j$ is a weighting factor for each feature quantity.

The similarity can be defined by the feature vector in equation (2). When image $I_p$ is to be retrieved, let us assume the following to be the similarity function with respect to another image $I_q$ in the database.

Sim(p, q)=$|\vec{fq}-\vec{fp}|^2$

Then, the smaller Sim(p, q) is, the higher the similarity becomes. Therefore, it is possible to determine the order of similarities by sequentially comparing the calculated feature quantity with all feature quantity files in the feature quantity database 10 and any databases and performing the calculation using the above-mentioned function.

As mentioned above, the input object data is converted to regularly latticed volume data. A feature quantity is calculated for the converted data. Thus, it is possible to calculate systematical feature quantities for all the input object data and define diverse feature quantities. As a result, a user can use various defined feature quantities for the similar object retrieval and accurately retrieve similar objects.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A feature quantity calculation device to calculate a feature quantity for a 3-D object from 3-D object data contained in said 3-D object comprising:
   a 3-D object data input module to input said 3-D object data;
   a 3-D object data analysis module for determining whether said input 3-D object data input by said 3-D object data input module is wire frame data or volume data;
   a volume data conversion module to convert the wire frame data to volume data, when said 3-D object data analysis module determines that said input 3-D object data is the wire frame data; and
   a feature quantity calculation module to calculate a feature quantity from said volume data to which said volume data conversion module converts the wire frame.

2. The feature quantity calculation device according to claim 1, wherein said 3-D object data includes vertex information and vertex connection information about said wire frame data or a polygon patch, and texture information about planes constituting said 3-D object.

3. The feature quantity calculation device according to claim 1, wherein
   said volume data conversion-module-comprises:
   an intersection point derivation module to derive intersection points between a cross section parallel to any face of a rectangular enclosure circumscribing said 3-D object and lines constituting wire frame data; and
   a cross section information generation module to generate information about said cross section by determining whether said intersection points are inside or outside said object.

4. The feature quantity calculation device according to claim 1, further comprising:
   a distance image generation module to project said converted volume data onto any plane of said rectangular enclosure and define a projection plane and to generate at least one distance image having as a pixel value a distance from the projection plane to a surface of said 3-D object, wherein
   said feature quantity calculation module calculates a feature quantity by using at least one distance image.

5. The feature quantity calculation device according to claim 1, further comprising:
   a database registration module to register a feature quantity calculated by said feature quantity calculation module to a database in association with said 3-D object data.

6. The feature quantity calculation device according to claim 1, wherein said feature quantity is calculated by combining a feature quantity calculated from said converted volume data with a feature quantity calculated from said wire frame data.

7. The feature quantity calculation device according to claim 1, wherein 3-D object data input from said 3-D object data input module is created through the use of a 3-D object generation tool or is input from a 3-D object input apparatus.

8. The feature quantity calculation device according to claim 1, wherein said feature quantity to be calculated is one of, or a combination of two or more of a shape, size, and surface texture of said object.

9. The feature quantity calculation device according to claim 1, wherein said volume data to which said volume data conversion module coverts the wire frame comprises voxel data.

10. A feature quantity calculation method of calculating a feature quantity for a 3-D object from 3-D object data contained in said 3-D object comprising:
    inputting said 3-D object data;
    determining whether said input 3-D object data is wire frame data or volume data;
    converting the wire frame data to volume data, when it is determined that said input 3-D object data is the wire frame data; and calculating a feature quantity from said volume data to which the wire frame is converted.

11. The feature quantity calculation method according to claim 10, wherein said converting volume data comprising:

deriving intersection points between a cross section parallel to any face of a rectangular enclosure circumscribing said 3-D object and lines constituting wire frame data; and generating information about said cross section by determining whether said intersection points are inside or outside said 3-D object.

12. The feature quantity calculation method according to claim 10, further comprising:

after converting said 3-D object data to volume data, projecting said converted volume data onto any plane of said rectangular enclosure and define a projection plane and generating at least one distance image having as a pixel value a distance from the projection plane to a surface of said 3-D object, wherein said calculation calculates a feature quantity by using at least one distance image.

13. The feature quantity calculation method according to claim 10, further comprising:

registering a feature quantity calculated by said calculation to a database in association with said 3-D object data.

14. The feature quantity calculation method according to claim 10, wherein said feature quantity is calculated by combining a feature quantity calculated from said converted volume data with a feature quantity calculated from said wire frame data.

15. The feature quantity calculation method according to claim 10, wherein said volume data to which the wire frame is converted comprises voxel data.

* * * * *